United States Patent
Cai et al.

(10) Patent No.: US 11,785,358 B1
(45) Date of Patent: Oct. 10, 2023

(54) METHOD AND SYSTEM FOR REDUCING COLUMN NOISE OF IMAGE SENSOR

(71) Applicant: Chengdu Image Design Technology Co., Ltd., Chengdu (CN)

(72) Inventors: Hua Cai, Chengdu (CN); Yong Wang, Chengdu (CN); Zheng Chen, Chengdu (CN); Fei Chen, Chengdu (CN); Tian Xia, Chengdu (CN)

(73) Assignee: Chengdu Image Design Technology Co., Ltd., Chengdu (CN)

( * ) Notice: Subject to any disclaimer, the term of this patent is extended or adjusted under 35 U.S.C. 154(b) by 0 days.

(21) Appl. No.: 17/896,113

(22) Filed: Aug. 26, 2022

(30) Foreign Application Priority Data

May 19, 2022 (CN) .......................... 202210547270.9

(51) Int. Cl.
*H04N 25/63* (2023.01)
*H04N 25/75* (2023.01)
*H04N 25/772* (2023.01)

(52) U.S. Cl.
CPC ............. *H04N 25/63* (2023.01); *H04N 25/75* (2023.01); *H04N 25/772* (2023.01)

(58) Field of Classification Search
None
See application file for complete search history.

(56) References Cited

U.S. PATENT DOCUMENTS

| | | | |
|---|---|---|---|
| 7,206,455 B1 | 4/2007 | Hatipoglu | |
| 9,832,402 B2 | 11/2017 | Elikhis et al. | |
| 2020/0169677 A1* | 5/2020 | Johnson | H04N 25/585 |

FOREIGN PATENT DOCUMENTS

| | | |
|---|---|---|
| CN | 108322679 B | 6/2020 |
| CN | 109495700 B | 4/2021 |

* cited by examiner

*Primary Examiner* — Mark T Monk
(74) *Attorney, Agent, or Firm* — Bayramoglu Law Offices LLC

(57) ABSTRACT

A method and a system for reducing column noise of an image sensor are provided. The method includes: reading dark pixel data in each image frame and reading initial effective pixel data in each image frame, where dark pixels and initial effective pixels are both arranged in N columns; sequentially calculating the dark pixel data to obtain an average value of each column of dark pixels and an entire average value of the dark pixels in each image frame; obtaining a corrected value of each column according to the average value of each column of dark pixels and the entire average value of the dark pixels; and calculating the corrected value of each column and the corresponding initial effective pixel data in each image frame to obtain target effective pixel data. In the method, the dark pixel data is pre-processed.

15 Claims, 4 Drawing Sheets

METHOD AND SYSTEM FOR REDUCING COLUMN NOISE OF IMAGE SENSOR

CROSS REFERENCE TO THE RELATED APPLICATIONS

This application is based upon and claims priority to Chinese Patent Application No. 202210547270.9, filed on May 19, 2022, the entire contents of which are incorporated herein by reference.

TECHNICAL FIELD

The present disclosure relates to the field of integrated circuit technologies, and in particular, to a method and a system for reducing column noise of an image sensor.

BACKGROUND

Complementary metal-oxide-semiconductor (CMOS) image sensors have been widely used in fields, such as video display, monitoring, industrial manufacturing, automobiles, home appliances, and others, which are involved in imaging. The main readout circuit structure of the CMOS image sensor is a column-level analog-to-digital converter (ADC)-based readout circuit, which ensures sufficient conversion accuracy and speed with reasonable power consumption. ADCs in different columns lead to a difference between columns due to factors, such as processing process and others, and such difference is unavoidable. When a system gain is relatively large, the difference is amplified, and column noise at a fixed position may be obviously seen from an image, which greatly affects the image quality.

The column noise is further affected by temperature, process corners, exposure time, and the like. To ensure that the column noise is suppressed under different environmental conditions, it is generally necessary to introduce a relatively complex algorithm for background data processing and store a large amount of multi-frame image data. By storing a plurality of frames of images and obtaining an average difference, and then subtracting the difference from an existing image, the column noise caused by the difference will not be seen in the synthesized image. However, a memory chip for the CMOS image sensor is required to store a plurality of frames of image data. This increases the system costs and is not applicable to applications with a relatively high output frame rate.

SUMMARY

An objective of the present disclosure is to provide a method and a system for reducing column noise of an image sensor, which can effectively eliminate the impact of column noise to improve image quality.

To achieve the objective, according to a first aspect, the present disclosure provides a method for reducing column noise of an image sensor. The method includes: reading dark pixel data in each image frame, and reading initial effective pixel data in each image frame, where dark pixels and initial effective pixels are both arranged in N columns, N is a natural number; sequentially calculating the dark pixel data to obtain an average value of each column of dark pixels and an entire average value of the dark pixels in each image frame; obtaining a corrected value of each column according to the average value of each column of dark pixels and the entire average value of the dark pixels; and calculating the corrected value of each column and the corresponding initial effective pixel data in each image frame to obtain target effective pixel data.

The method for reducing column noise of an image sensor provided by the present disclosure has the beneficial effect that the dark pixel data is processed and calculated to obtain the corrected value of each column, and then the corrected value of each column and the initial effective pixel data are calculated to obtain the target effective pixel data. A mismatch value between the columns is subtracted to effectively suppress the column noise, thereby improving the image quality.

The step of calculating the dark pixel data to obtain an average value of each column of dark pixels and an entire average value of the dark pixels includes:
performing a column average value calculation on the N columns of dark pixels to obtain the average value of each column of dark pixels; and
performing an entire average value calculation on the N columns of dark pixels to obtain the entire average value of the dark pixels.

Optionally, the step of obtaining a corrected value of each column according to the average value of each column of dark pixels and the entire average value of the dark pixels includes: calculating a difference between the average value of each column of dark pixels and the entire average value of the dark pixels to obtain the corrected value of each column; and after the step of obtaining the corrected value of each column, the method includes storing the corrected value of each column into a register, so as to facilitate application of the corrected value of each column.

Optionally, the step of reading dark pixel data in each image frame includes: after the pixel array performs pixel photosensitizing, forming, by each of the dark pixels, an analog voltage; and performing analog-to-digital conversion on the analog voltage to obtain the dark pixel data, where the pixel array is formed by a plurality of pixel units including the dark pixels and the initial effective pixels.

Optionally, the step of calculating the corrected value of each column and the corresponding initial effective pixel data in each image frame to obtain target effective pixel data includes: flipping the corrected value of each column, and performing a summation operation with the initial effective pixel data to obtain the target effective pixel data; or calculating a difference between the corrected value of each column and the initial effective pixel data to obtain the target effective pixel data.

According to a second aspect, an embodiment of the present disclosure provides a system for reducing column noise of an image sensor, including a reading unit configured to read dark pixel data in each image frame, and read initial effective pixel data in each image frame, where dark pixels and initial effective pixels are both arranged in N columns;
a data processing unit configured to sequentially calculate the dark pixel data to obtain an average value of each column of dark pixels and an entire average value of the dark pixels in each image frame;
the data processing unit being further configured to obtain a corrected value of each column according to the average value of each column of dark pixels and the entire average value of the dark pixels; and
a correction unit configured to calculate the corrected value of each column and the corresponding initial effective pixel data in each image frame to obtain target effective pixel data.

The beneficial effect of the present disclosure is as follows: the dark pixel data is processed and calculated to obtain the corrected value of each column of dark pixels, and then the corrected value of each column of dark pixels and the initial effective pixel data are calculated to obtain the target effective pixel data. A mismatch value between the columns is subtracted to effectively suppress the column noise, thereby improving the image quality.

the data processing unit is configured to perform a column average value calculation on the N columns of dark pixels to obtain the average value of each column of dark pixels; and perform an entire average value calculation on the N columns of dark pixels to obtain the entire average value of the dark pixels.

Optionally, the data processing unit is further configured to calculate a difference between the average value of each column of dark pixels and the entire average value of the dark pixels to obtain the corrected value of each column and is further configured to store the corrected value of each column into a register after obtaining the corrected value of each column.

Optionally, after a plurality of pixel units performs pixel photosensitizing, each of the pixel units forms an analog voltage.

Column analog-to-digital converters perform analog-to-digital conversion to obtain the dark pixel data, where each of the column analog-to-digital converters corresponds to each column of the pixel units.

Optionally, the correction unit is further configured to flip the corrected value of each column in each image frame and perform a summation operation with the corresponding initial effective pixel data to obtain target effective pixel data.

Optionally, the correction unit is further configured to calculate a difference between the corrected value of each column and the initial effective pixel data to obtain the target effective pixel data.

DETAILED DESCRIPTION OF THE EMBODIMENTS

To make the objectives, technical solutions, and advantages of the present disclosure clearer, the technical solutions in the embodiments of the present disclosure are clearly and completely described below with reference to the accompanying drawings in the embodiments of the present disclosure. Apparently, the described embodiments are some but not all of the embodiments of the present disclosure. All other examples obtained by a person of ordinary skill in the art based on the examples of the present disclosure without creative efforts shall fall within the protection scope of the present disclosure. All other examples obtained by a person of ordinary skill in the art based on the examples of the present disclosure without creative efforts shall fall within the protection scope of the present disclosure. Unless otherwise defined, the technical and scientific terms used herein are as they are usually understood by those skilled in the art to which the present disclosure pertains. "Comprising" and similar words used in the present disclosure mean that an element or article appearing before the term includes elements or articles and their equivalent elements appearing behind the term, not excluding any other elements or articles.

Figure 1:
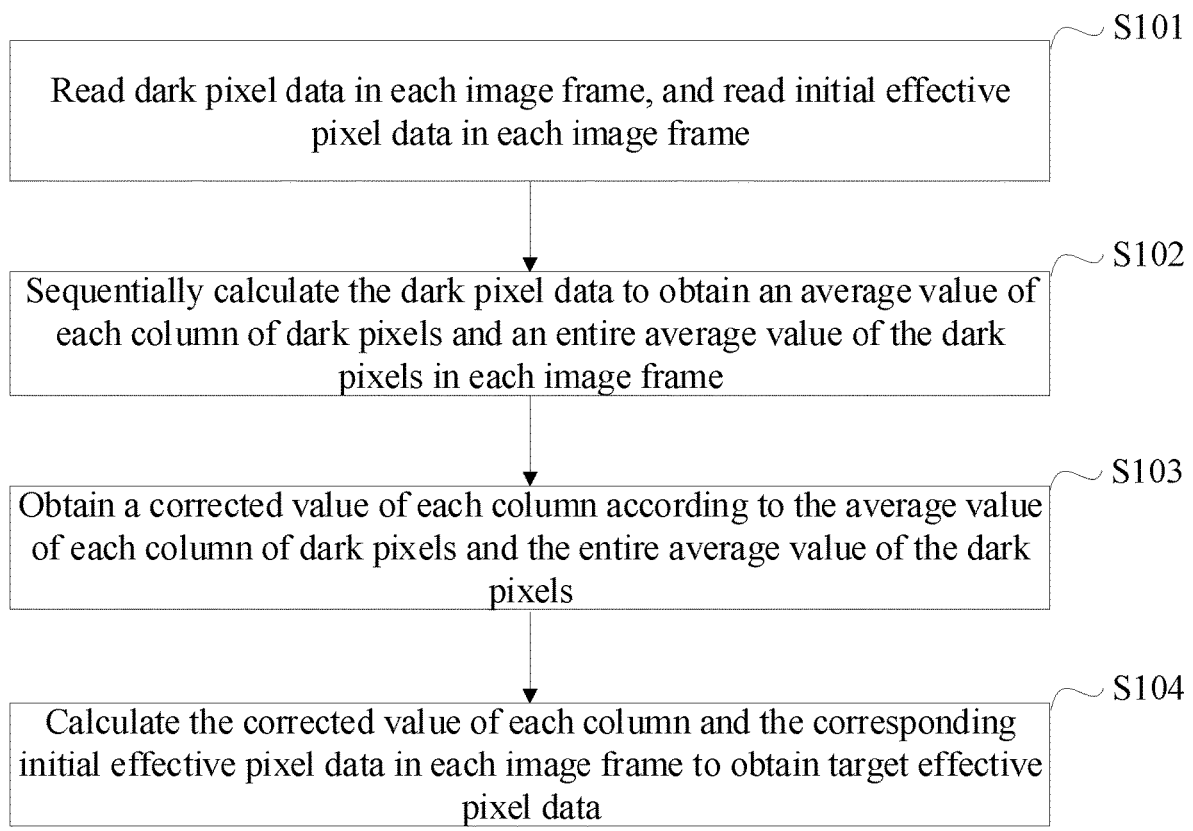
FIG. 1 is a flowchart of a method for reducing column noise of an image sensor according to an embodiment of the present disclosure.

To solve the problem in the related art, an embodiment of the present disclosure provides a method for reducing column noise of an image sensor. Referring to FIG. 1, the method includes the following steps.

S101. Read dark pixel data in each image frame, and read initial effective pixel data in each image frame, where dark pixels and initial effective pixels are arranged in N columns.

Before the step, and after the pixel array performs pixel photosensitizing, each of the dark pixels forms an analog voltage, and then performs analog-to-digital conversion on the analog voltage to form a corresponding digital value, that is, the dark pixel data. It should be noted that the pixel array is formed by a plurality of columns of pixel units including N columns of dark pixels and N columns of initial effective pixels. Each column of pixel units corresponds to one column analog-to-digital converter. The finally obtained dark pixel data is temporarily stored in a column storage unit for subsequent processing.

S102. Sequentially calculate the dark pixel data to obtain an average value of each column of dark pixels and an entire average value of the dark pixels in each image frame.

In the step, a column average value calculation is performed on the N columns of dark pixels to obtain the average value of each column of dark pixels, and an entire average value calculation is performed on the N columns of dark pixels to obtain the entire average value of the dark pixels.

S103. Obtain a corrected value of each column according to the average value of each column of dark pixels and the entire average value of the dark pixels.

In this embodiment, a difference between the average value of each column of dark pixels and the entire average value of the dark pixels is calculated to obtain the corrected value of each column, and the corrected value of each column is stored in a register for convenient use. In some embodiments, the average value of each column of dark pixels may be flipped and then a summation operation is performed with the entire average value of the dark pixels to obtain the corrected value of each column.

S104. Calculate the corrected value of each column and the corresponding initial effective pixel data in each image frame to obtain target effective pixel data.

In the step, the corrected value of each column in the register is flipped, and then the summation operation is performed between the flipped corrected value of each column in the register and N columns of corresponding initial effective pixels to obtain the target effective pixel data. Alternatively, a difference between the corrected value of each column and the initial effective pixel data is directly calculated to obtain the target effective pixel data.

Figure 2:
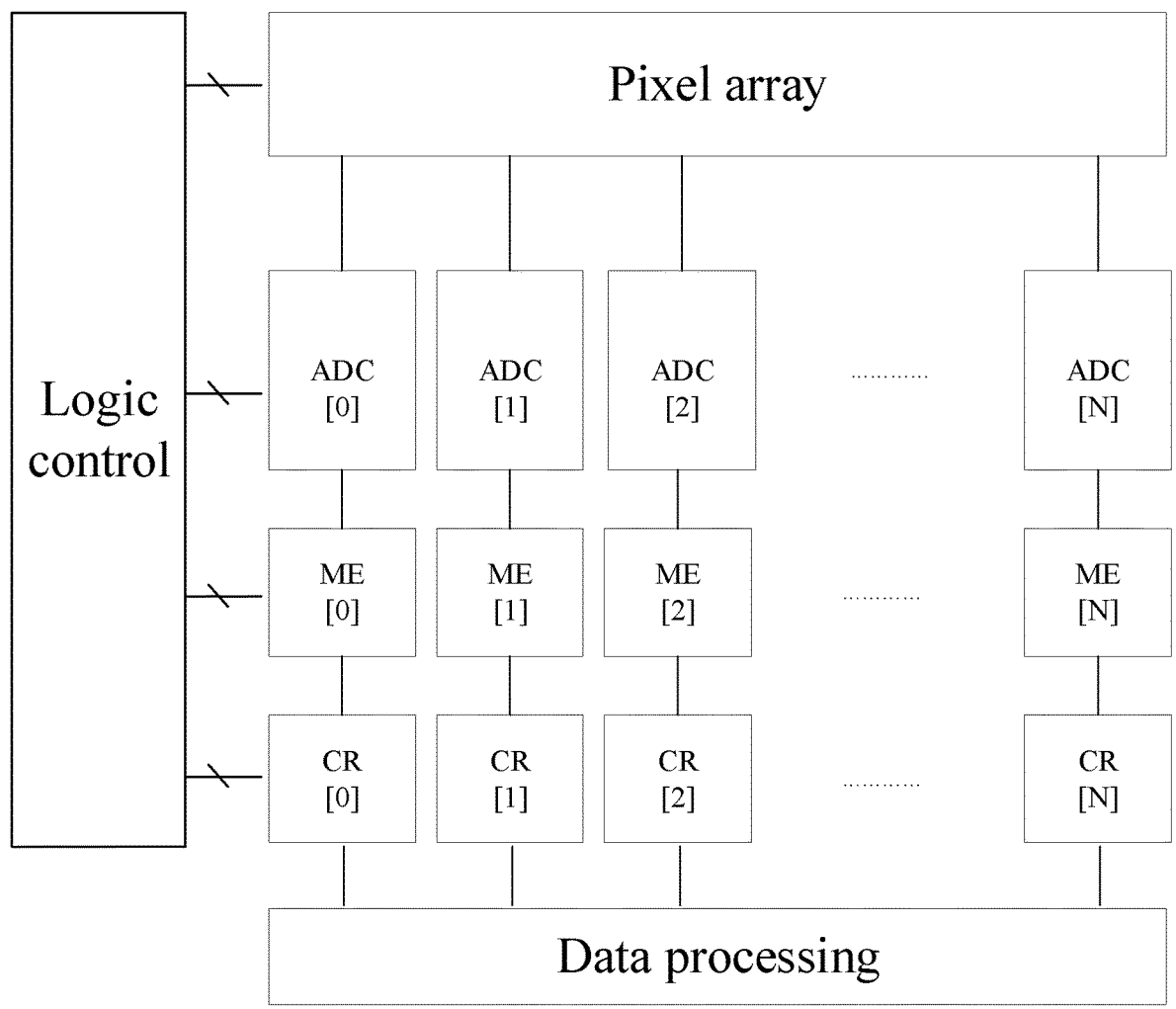
FIG. 2 is a schematic diagram of an entire circuit architecture of a system for reducing column noise of an image sensor according to an embodiment of the present disclosure.

In this embodiment, referring to FIG. 2, after the pixel array performs pixel photosensitizing, the each of the dark pixels forms an analog voltage, and then a column analog-to-digital converter (ADC) performs analog-to-digital conversion on the analog voltage to form a corresponding digital value, that is, the dark pixel data, and the dark pixel data is sequentially stored in a corresponding storage unit (ME). Data processing is performed on the dark pixel data to obtain an average value of each column of dark pixels and an entire average value of the dark pixels. A difference between the average value of each column of dark pixels and the entire average value of the dark pixels is calculated to obtain a corrected value of each column, and the corrected value of each column is stored in each column of registers of the correction unit (CR). It should be noted that in another embodiment, the register is replaced with a device with a storage function to store the corrected value. Details are not described herein. When initial effective pixel data is read out from each image frame, the corrected value of each column in the register is flipped, and a summation operation is performed between the flipped corrected value of each column in the register and the initial effective pixel data. In this way, a mismatch value between the columns is subtracted to effectively suppress the column noise, thereby improving the image quality.

Figure 3:
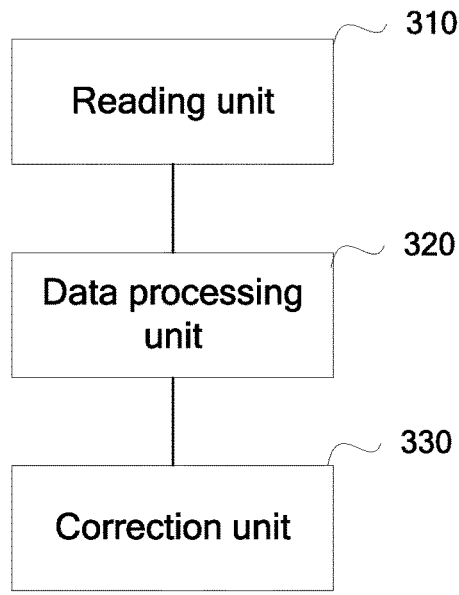
FIG. 3 is a schematic structural diagram of a system for reducing column noise of an image sensor according to an embodiment of the present disclosure.

Another embodiment of the present disclosure provides a system for reducing column noise of an image sensor. Referring to FIG. 3, the system includes: a reading unit 310 configured to read dark pixel data in each image frame and read initial effective pixel data in each image frame, where dark pixels and initial effective pixels are arranged in N columns; a data processing unit 320 configured to sequentially calculate the dark pixel data to obtain an average value of each column of dark pixels and an entire average value of the dark pixels in each image frame and further configured to obtain a corrected value of each column according to the average value of each column of dark pixels and the entire average value of the dark pixels; and a correction unit 330 configured to flip the corrected value of each column in each image frame, and perform a summation operation with the corresponding initial effective pixel data or calculate a difference between the corrected value of each column and the initial effective pixel data to obtain target effective pixel data.

In this embodiment, the dark pixel data is processed and calculated to obtain the corrected value of each column, and then the corrected value of each column is flipped and calculated with the corresponding initial effective pixel data to obtain the target effective pixel data. A mismatch value between the columns is subtracted to effectively suppress the column noise, thereby improving the image quality.

Figure 4:
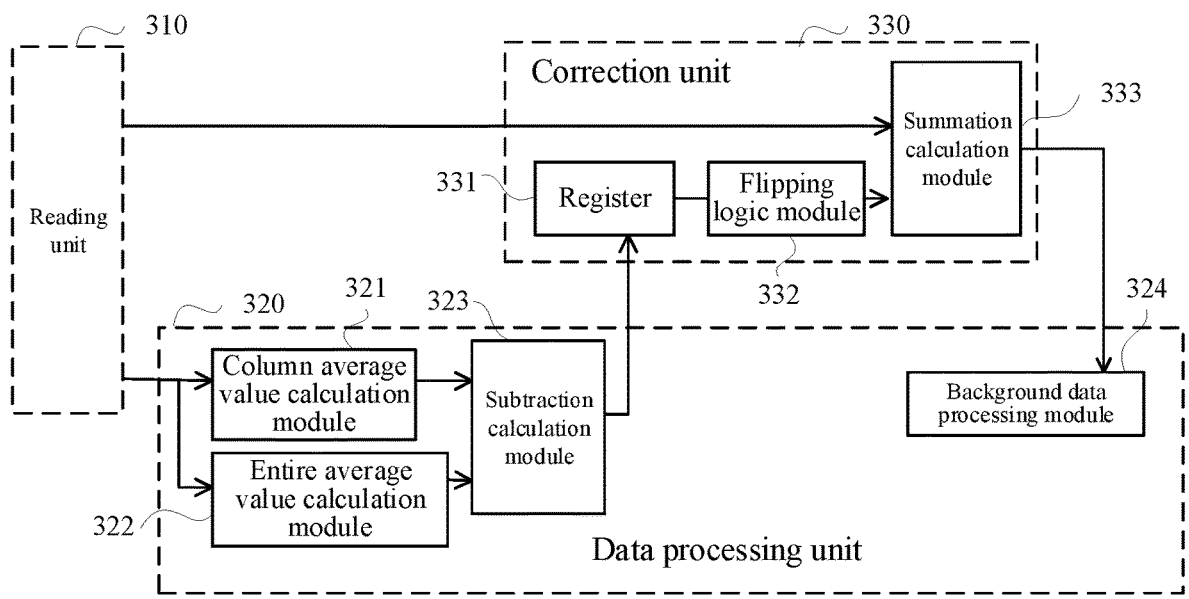
FIG. 4 is a detailed diagram of a system for reducing column noise of an image sensor according to an embodiment of the present disclosure.

Specifically, referring to FIG. 4, the data processing unit 320 includes a column average value calculation module 321, an entire average value calculation module 322, a subtraction calculation module 323, and a background data processing module 324. Both the column average value calculation module 321 and the entire average value calculation module 322 are electrically connected to the subtraction calculation module 323. The correction unit 330 includes a register 331, a flipping logic module 332, and a summation calculation module 333. The subtraction calculation module 323 is electrically connected to the register 331. The register 331 is electrically connected to the flipping logic module 332 and the summation calculation module 333 sequentially. The column average value calculation module 321 of the data processing unit 320 is configured to perform a column average value calculation on the N columns of dark pixels to obtain the average value of each column of dark pixels. The entire average value calculation module 322 performs an entire average value calculation on the N columns of dark pixels to obtain the entire average value of the dark pixels. The subtraction calculation module 323 calculates a difference between the average value of each column of dark pixels and the entire average value of the dark pixels to obtain the corrected value of each column, and the corrected value of each column is stored in the register 331 of the correction unit 330. After the reading unit 330 reads the initial effective pixel data in each image frame, the flipping logic module 332 flips the corrected value. The summation calculation module 333 performs the summation operation on the flipped corrected value and the initial effective pixel data to obtain the target effective pixel data. The target effective pixel data is processed by the background data processing module 324.

Figure 5:
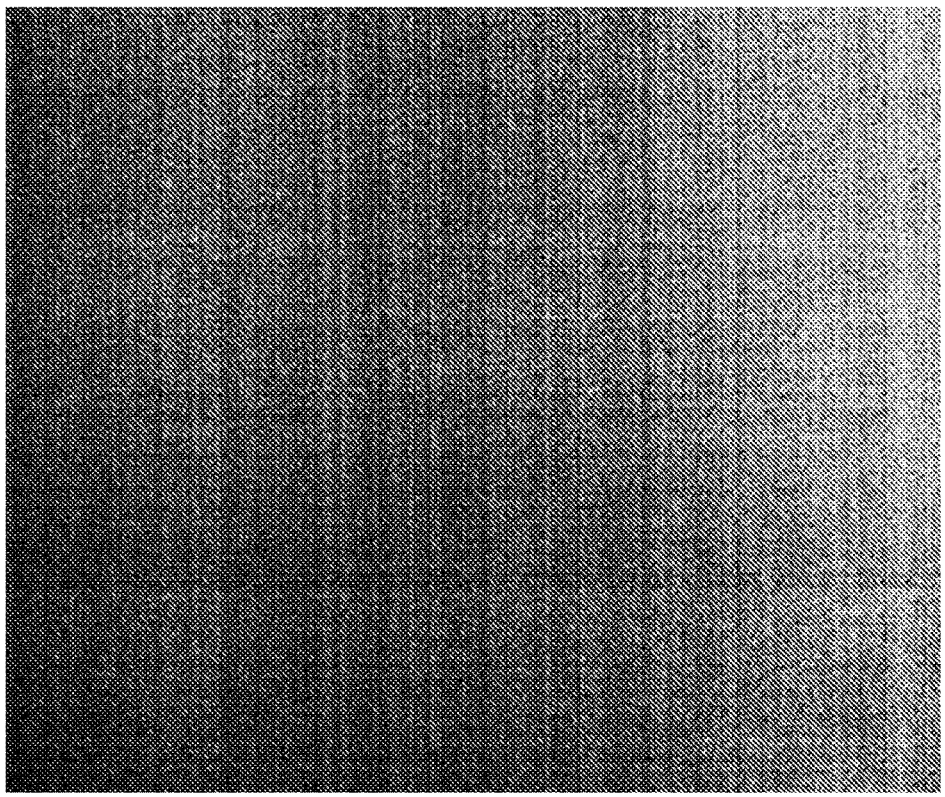
FIG. 5 is a schematic diagram of an output image when correction logic is not used according to an embodiment of the present disclosure.
Figure 6:
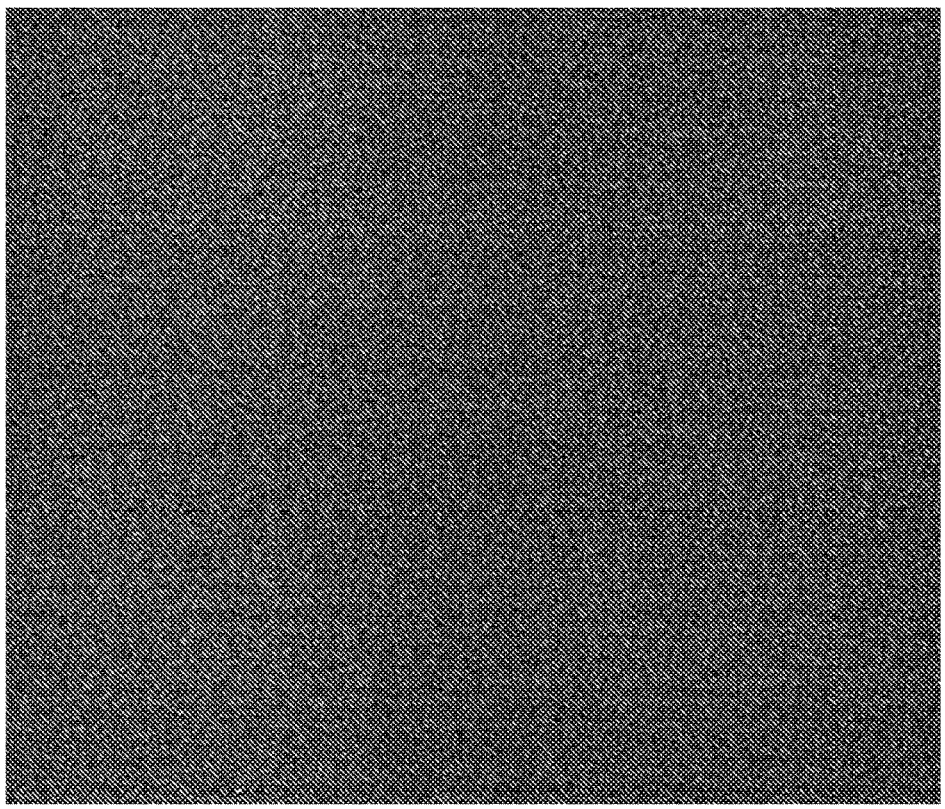
FIG. 6 is a schematic diagram of an output image when correction logic is used according to an embodiment of the present disclosure.

Referring to FIG. 5 and FIG. 6, when other prerequisites are the same, FIG. 5 is an output image when correction logic of the method in the present invention is not used, and FIG. 6 is an output image when the correction logic works. Through comparison, it is found that the correction logic can effectively eliminate the impact of the column noise and improve the image quality.

The above descriptions are only specific implementations of the embodiments of the present disclosure. However, the protection scope of the present disclosure is not limited thereto, and any modification or substitution within the technical scope disclosed by the embodiments of this application shall fall within the protection scope of the embodiments of this application. Therefore, the protection scope of the embodiments of this application should be subject to the protection scope of the claims.

What is claimed is:

1. A method for reducing column noise of an image sensor, comprising:
   reading dark pixel data in each image frame and reading initial effective pixel data in each image frame, wherein dark pixels and initial effective pixels are arranged in N columns;
   sequentially calculating the dark pixel data to obtain an average value of each column of dark pixels in each image frame and an entire average value of the dark pixels in each image frame;
   obtaining a corrected value of each column according to the average value of each column of dark pixels and the entire average value of the dark pixels; and
   calculating the corrected value of each column in each image frame and the initial effective pixel data in each image frame to obtain target effective pixel data, wherein the initial effective pixel data in each image frame corresponds to the corrected value of each column in each image frame.

2. The method according to claim 1, wherein the dark pixel data comprises N columns of dark pixels, and N is a natural number; and
   the step of calculating the dark pixel data to obtain the average value of each column of dark pixels and the entire average value of the dark pixels comprises:
   performing a column average value calculation on the N columns of dark pixels to obtain the average value of each column of dark pixels; and
   performing an entire average value calculation on the N columns of dark pixels to obtain the entire average value of the dark pixels.

3. The method according to claim 1, wherein the step of obtaining the corrected value of each column according to the average value of each column of dark pixels and the entire average value of the dark pixels comprises:
  calculating a difference between the average value of each column of dark pixels and the entire average value of the dark pixels to obtain the corrected value of each column; and
  after obtaining the corrected value of each column, the method comprises a step of storing the corrected value of each column into a register.

4. The method according to claim 1, wherein the step of reading the dark pixel data in each image frame comprises:
  after a pixel array performs a pixel photosensitizing, forming, by each of the dark pixels, an analog voltage; and
  performing an analog-to-digital conversion on the analog voltage to obtain the dark pixel data;
  wherein the pixel array is formed by a plurality of pixel units, the plurality of pixel units comprises the dark pixels and the initial effective pixels.

5. The method according to claim 1, wherein the step of calculating the corrected value of each column in each image frame and the initial effective pixel data in each image frame to obtain the target effective pixel data comprises:
  flipping the corrected value of each column and performing a summation operation with the initial effective pixel data to obtain the target effective pixel data; or
  calculating a difference between the corrected value of each column and the initial effective pixel data to obtain the target effective pixel data.

6. The method according to claim 2, wherein the step of obtaining the corrected value of each column according to the average value of each column of dark pixels and the entire average value of the dark pixels comprises:
  calculating a difference between the average value of each column of dark pixels and the entire average value of the dark pixels to obtain the corrected value of each column; and
  after obtaining the corrected value of each column, the method comprises a step of storing the corrected value of each column into a register.

7. A system for reducing column noise of an image sensor, comprising:
  a reading unit, wherein the reading unit is configured to read dark pixel data in each image frame and the reading unit is configured to read initial effective pixel data in each image frame, wherein dark pixels and initial effective pixels are arranged in N columns;
  a data processing unit, wherein the data processing unit is configured to sequentially calculate the dark pixel data to obtain an average value of each column of dark pixels in each image frame and an entire average value of the dark pixels in each image frame;
  wherein the data processing unit is further configured to obtain a corrected value of each column according to the average value of each column of dark pixels and the entire average value of the dark pixels; and
  a correction unit, wherein the correction unit is configured to calculate the corrected value of each column in each image frame and the initial effective pixel data in each image frame to obtain target effective pixel data, wherein the initial effective pixel data in each image frame corresponds to the corrected value of each column in each image frame.

8. The system according to claim 7, wherein the dark pixel data comprises N columns of dark pixels, and N is a natural number; and
  the data processing unit is configured to perform a column average value calculation on the N columns of dark pixels to obtain the average value of each column of dark pixels; and perform an entire average value calculation on the N columns of dark pixels to obtain the entire average value of the dark pixels.

9. The system according to claim 7, wherein
  the data processing unit is further configured to calculate a difference between the average value of each column of dark pixels and the entire average value of the dark pixels to obtain the corrected value of each column; and
  the data processing unit is further configured to store the corrected value of each column into a register after obtaining the corrected value of each column.

10. The system according to claim 7, wherein after a plurality of pixel units performs a pixel photosensitizing, each of the dark pixels forms an analog voltage, wherein the plurality of pixel units comprises the dark pixels and the initial effective pixels; and
  column analog-to-digital converters perform an analog-to-digital conversion on the analog voltage to obtain the dark pixel data, wherein the column analog-to-digital converters each correspond to each column of the plurality of pixel units.

11. The system according to claim 7, wherein
  the correction unit is further configured to flip the corrected value of each column and the correction unit is further configured to perform the summation operation with the initial effective pixel data to obtain the target effective pixel data; or
  the correction unit is further configured to calculate a difference between the corrected value of each column and the initial effective pixel data to obtain the target effective pixel data.

12. The system according to claim 7, wherein the data processing unit comprises a column average value calculation module, an entire average value calculation module, and a subtraction calculation module; and
  the column average value calculation module and the entire average value calculation module are electrically connected to the subtraction calculation module, and the column average value calculation module and the entire average value calculation module are electrically connected to the reading unit.

13. The system according to claim 12, wherein the correction unit comprises a register, a flipping logic module, and a summation calculation module;
  the register is electrically connected to the flipping logic module and the summation calculation module sequentially; and
  the summation calculation module is further electrically connected to the reading unit.

14. The system according to claim 13, wherein the data processing unit further comprises a background data processing module, and the background data processing module is electrically connected to the summation calculation module.

15. The system according to claim 8, wherein
  the data processing unit is further configured to calculate a difference between the average value of each column of dark pixels and the entire average value of the dark pixels to obtain the corrected value of each column; and
  the data processing unit is further configured to store the corrected value of each column into a register after obtaining the corrected value of each column.

* * * * *